United States Patent [19]
Ducommun

[11] 4,299,457
[45] Nov. 10, 1981

[54] CAMERA

[75] Inventor: Pierre-Francois Ducommun, Grandson, Switzerland

[73] Assignee: Bolex International SA, Yverdon, Switzerland

[21] Appl. No.: 89,811

[22] Filed: Oct. 13, 1979

[30] Foreign Application Priority Data

Nov. 7, 1978 [CH] Switzerland ..................... 11443/78

[51] Int. Cl.³ .............................................. G03B 3/00
[52] U.S. Cl. .................................... 352/140; 354/198
[58] Field of Search ................. 352/140; 354/25, 198, 354/200, 201; 355/56

[56] References Cited
U.S. PATENT DOCUMENTS 3,972,056 7/1976 Tsujimoto et al. ............. 352/140 X
4,183,639 1/1980 Suwa .............................. 352/140 X Primary Examiner—Michael L. Gellner
Attorney, Agent, or Firm—Martin A. Farber

[57] ABSTRACT

The distance or range setting of a camera lens is most accurate if the focal length and thus the image scale are as large as possible. It is therefore most favorable, if it is desired to effect an accurate distance setting, first of all by a mechanism to move the objective lens to the longest focal length, then to effect the distance setting and only then to move to the desired focal length. A storage or memory device stores the original focal length.

11 Claims, 4 Drawing Figures

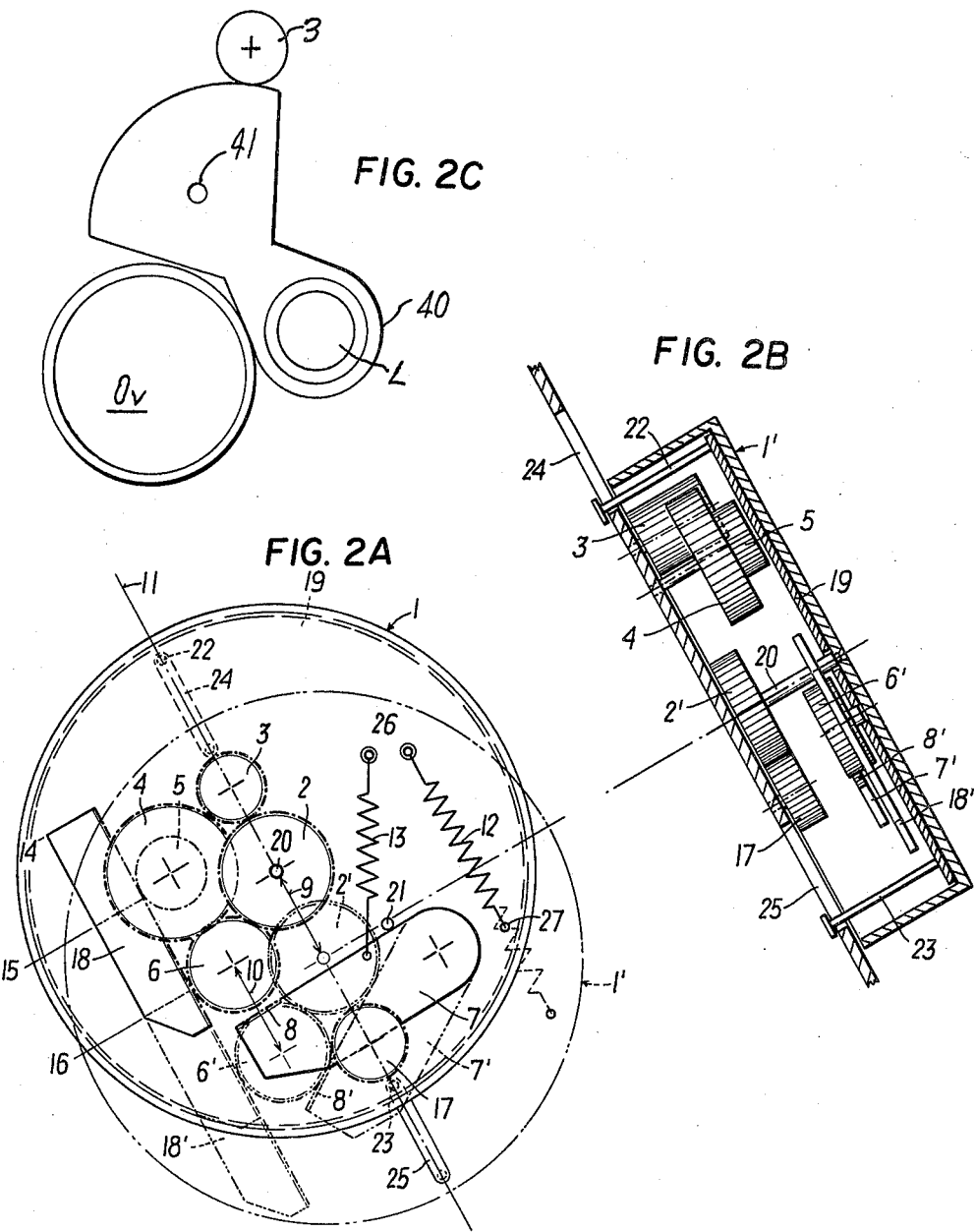

CAMERA

The invention relates to a camera having an objective lens which has a distance or range setting and a focal length setting or focusing device as well as a testing device for determining the difference between the distance set on the objective lens and the distance away of the object, which testing device, if the two distances do not agree, can produce a difference signal the value of which for constant distances is dependent on the focal length of which the objective lens is set.

In order to set the distance on an objective lens it is known to set the objective lens to the longest focal length by swinging a lens element into the ray path of the objective lens so as to be able in this way more accurately to effect the distance setting by means of a ground glass screen or split wedges.

This type of distance setting has the disadvantage that the objective lens must either be first brought to a given focal length in order to assure a desired image geometry upon the swinging-in of the lens element so that, with the same expense, the focal length can be set directly at its selected value, or the objective lens must be so designed that the swinging in of a lens element leaves the image plane unchanged at all focal lengths, as a result of which the other parameters of the lens would be unnecessarily limited.

Another manner of setting the distance with simultaneous adjustment of the focal length to the most favorable value is effected by swinging a sharpness indicator into the ray path of the objective lens, in which case, simultaneously with the swinging motion, the focal length is set to its largest value by displacement of the lens members which corresponds to a normal variation in focal length.

Every modern camera is today provided with a sharpness-of-focus indicator such as a ground glass screen, prism raster, split wedge, lens raster or the like, so that after elimination of the necessity of swinging the sharpness-of-focus indicator into the lens, there now only remains the focusing adjustment which in any event is generally effected by means of a ring on the lens, in which connection a second possibility of varying the focus or focal length which does not have any additional functions is meaningless.

It is furthermore known to set, by a single setting means, for instance a lens ring with two different types of actuation, such as turning and axial displacement, on the one hand the distance and on the other hand focal length, the two settings being adapted to be effected independently of each other.

The object of the present invention is to design a distance-setting device of the afore-mentioned type by means of which, regardless of the actual focal length, the distance setting is effected, for instance, at maximum focal length, and then, after the setting of the distance, the original focal length is again set on the lens.

This is aided in accordance with the invention in the manner that there is provided a program control device (IG, S1, S2, T, Sp, Q) which is actuatable by means of a switching means (HS) and by which, during the first phase of operation, the focal length of the objective lens (Ov) can be stored in a memory device (Sp) and in a second phase the focal length can be set by means of the focal length setting device (BM, BR) to a value for which the difference signal of the test device is a maximum for constant distance conditions; then in a third phase the distance can be set on the objective lens manually or automatically by turning of the distance setting ring ER, and in a final phase the focal length of the objective lens can be set back to the originally stored focal length.

Further in accordance with the invention the testing device is formed by a split-prism range finder by which the greatest difference signal can be produced at the longest focal length.

Still further the first two phases can be carried out automatically by the actuation of a main switch (HS).

Yet further in accordance with the invention after the automatic carrying out of the first two phases, a signal which is perceptible to the user of the camera can be produced in order to remind the user of the distance setting.

The change in the focal length can be effected by swinging a lens element (L) into position.

With a camera having a setting means actuatable in different modes of actuation as above mentioned the setting means (e.g. handle knob) (1) comprises a cup-shaped hollow cylinder on the axis of symmetry of which there is arranged a gear wheel (2) which is rigidly connected with the setting means and which, upon displacement (9) of the setting means (1) can engage into various other gear wheels (3, 17), the respective corresponding gear wheel (3) or (17) at the time being turned by subsequent turning of the setting means (1).

Still further in accordance with the invention another gear wheel (6) as well as a rack lever (18) are provided, the rack lever being moved, upon rotation of the gear wheel (2) by means of direct or indirect (4, 5) drive by the rotating gear wheel (3), which movement can be transmitted to the gear wheel (6), the latter being lockable in any desired position by means of a locking lever (7), and upon displacement of the setting means (1) out of a normal position the locking lever (7) and the gear wheel (6) can be brought into a position which locks the gear wheel (6), whereupon the rack lever (18) upon displacement (9) of the setting means (1) can be carried along by the gear wheel (6) which is mounted on the setting means (1) and the movement of which can be transmitted to the gear wheel (3) in such a manner that upon backward or return displacement of the setting means (1) into its normal position the gear wheel (3) can be brought back again, with the reversal of all the processes, into the rotary position which it had before the displacement of the setting means (1).

With the above and other objects and advantages in view, the present invention will become more clearly understood in connection with the detailed description of a preferred embodiment, when considered with the accompanying drawings, of which:

FIG. 2A shows a plan view of a mechanical embodiment of the invention;

FIG. 2B is an elevational view of the embodiment of FIG. 2;

FIG. 2C is a plan view showing an additional, pivotally mounted lens

Figure 1:
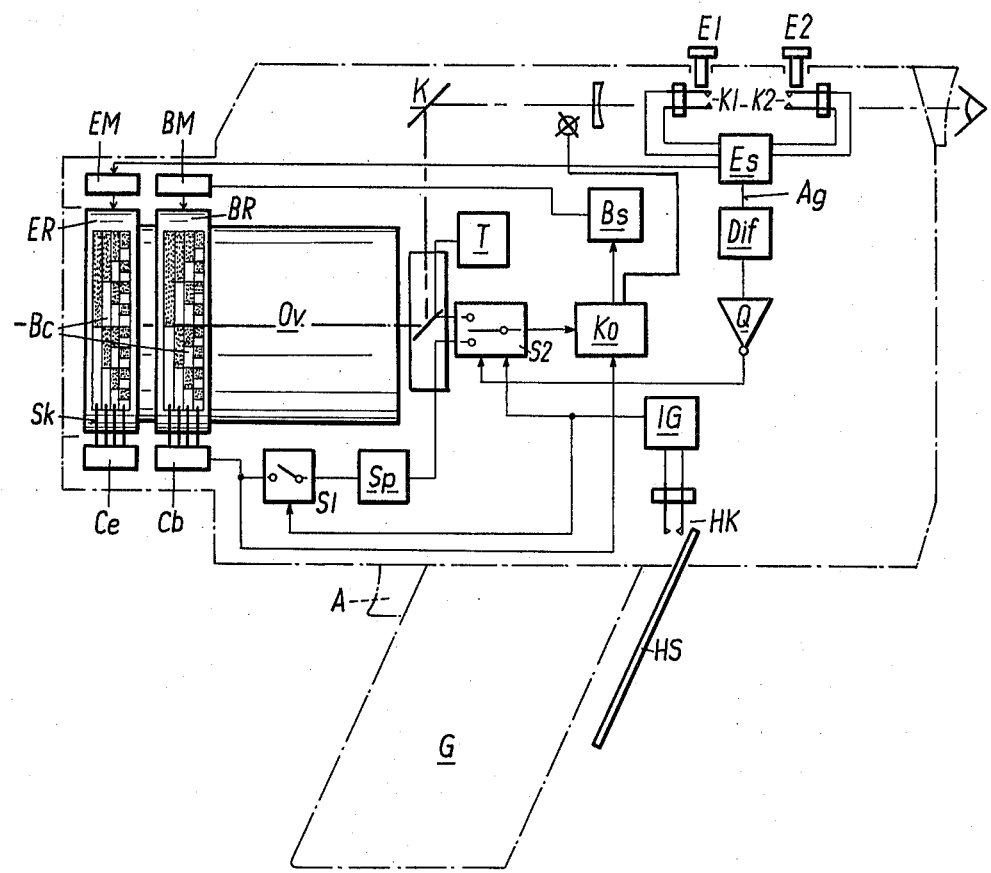
FIG. 1 shows diagrammatically an electronic program control device in accordance with the invention.

Referring now to the drawings and particularly to FIG. 1, a camera K has a lens OV with two setting rings ER and BR which serve for the setting of the distance and the focal length respectively. The two rings are moved by motors EM and BM, respectively, a development of the camera which is known under the names of Powerzoom and Powerfocus.

The two lens rings bear binary coded conductive tracks Bc which are sensed or scanned by wiper or sliding contacts. The information with regard to the position of the setting rings is processed to form binary numbers in the coding devices Ce and Cb, respectively.

The binary number corresponding to the focus or focal length can be stored in a memory Sp, provided that the switch S1 is closed. Such a switch is, of course, incorporated in an integrated circuit or chip, the information available at the information inputs being stored by means of a charging pulse at an input of the IC intended for this.

A change in the focal length is effected by feeding to a comparator Ko on the one hand the binary number corresponding to the instantaneous focal length and on the other hand the binary number corresponding to a desired focal length, the focal length motor BM being activated by the output signal of the comparator Ko via a control device Bs until the same binary numbers are present at the comparator Ko via the feedback from the wiper contacts for the conductive tracks Bc.

Furthermore the camera K has two distance setting buttons E1 and E2 which act on two contacts K1 and K2. Upon pressing one of the two buttons E1 or E2, the distance setting ring ER is turned by means of the motor EM, which motor is controlled by the control device Es, in the direction corresponding to the greater or smaller distance depending upon which of the two buttons has been pressed.

As long as one of the two buttons is depressed, the distance control device Es produces a positive potential at its output Ag. The changes in potential upon the depression and release of the distance setting buttons are differentiated in a differentiating stage Dif, whereby a connection switch-on flank produces a positive pulse and a disconnection switch-off flank produces a negative pulse. After inversion, a positive pulse is obtained from the negative pulse and the originally positive pulse disappears, since it produces zero potential likewise as does the rest condition. If the main switch HS is now pressed, a pulse having two purposes is produced by the pulse generator IG due to the closing of the contact HK. This pulse first of all closes the switch S1 so that the instantaneous position of the zoom ring BR is stored in the memory Sp and, secondly, by means of a changeover switch S2, it connects a memory T (in which the binary number corresponding to the teleposition of the lens Ov is stored) to the comparator Ko, the second input of which is permanently fixedly connected with the coding device Cb. For the reasons already indicated, the objective lens is thereby brought into the teleposition.

With this setting of the focal length into the tele-position, the setting of the distance is most favorable and accurate since most sharpness-of-focus indicators operate most accurately here.

The setting of the distance is effected by means of the setting buttons E1 and E2. After the setting thereof the memory Sp in which the original focal length is stored is connected to the comparator Ko by the positive pulse to the change-over switch S2 produced by the inverter Q so that the objective lens is brought back again to the old focal length setting.

For purposes of clarity, FIG. 1 shows only the elements necessary for the basic operation of the distance setting device. Thus, for instance, in case of alternate actuation of the distance setting buttons care must be taken that upon the first release of a button the pulse for the restoring of the focal length is not produced, this being achieved, for instance, by means for delaying the pulse and the destruction thereof when one of the buttons E1 or E2 is again depressed.

Similarly, of course, in case of a manual adjustment of the distance, a pulse for the setting of the focal length must be produced, which can be done in simple fashion as a result of the fact that the rotation of the distance setting ring is sensed directly in known manner, a positive potential being produced upon rotation, this potential corresponding to the potential at the output Ag of the distance control device.

As indicated in FIG. 1, after storing the focal length of the objective lens in the memory and after setting the focal length via the focal length setting device to a value for which the different signal of the testing device is a maximum for constant distant conditions, a signal which is perceptible to the user of the camera is provided in order to remind the user of the distance (range) setting. This occurs by the wire emananating from Ko at the schematically illustrated LED in the viewer of the camera.

Referring now again to the drawings, FIGS. 2A and 2B show a mechanical distance and focal length setting device in accordance with the invention in the form of a rotatable and displaceable setting knob 1. To facilitate understanding, the device is shown in a plan view (FIG. 2A) and elevation (FIG. 2B), the same parts bearing the same reference numbers.

The setting knob 1 which is formed in the shape of a cup is rigidly connected with a coaxial friction or gear wheel 2 so that the latter also rotates therewith upon turning, thus transmitting the rotation to another gear wheel 3. In a manner not shown in the drawing, for instance by means of a coaxial shaft, the wheel 3 effects a focal length displacement on the objective lens, also not shown in the drawing. A wheel 4, with which a wheel 5 is coaxially connected, is also in engagement with the wheel 3 so that, upon the turning of the adjustment knob 1, it also turns and transmits this movement by means of the wheel 5 to a rack lever 18 which is displaceable in the longitudinal direction, the lever being shown in three different positions 14, 15 and 16, for purposes of illustration.

If the objective lens is set at the shortest focal length, then the lever 18 is in the position 14 and upon the turning of the setting knob 1 in a counter-clockwise direction the lever 18 is pushed into the position 15.

Also in engagement with the lever 18 is another gear wheel 6 which is rotatably mounted on a plate 19, which plate is displaceable but not rotatable with the setting knob 1, the plate 19 being guided on columns 22 and 23 in slots 24 and 25 of the camera housing. The wheel 6 turns upon displacement of the rack lever 18 so that the position of the lever 18 relative to the wheel 6 represents a function of the focal length.

There is furthermore a swingable locking lever 7 which, in a normal condition, is held by a stop 21 and a spring 13 in a position in which its row of teeth 8 is still just or slightly maintained out of engagement with the gear wheel 6.

If the setting knob 1 is now pushed to the bottom right into position 1', then the two gear wheels 2 and 6 also move in positive manner, as indicated by the gear wheels 2' and 6' shown in dashed line. After a short initial movement of the setting knob 1 and thus of the gear wheel 6, the latter engages in the row of teeth 8 of the locking lever 7 and is secured against turning so that it pulls with it the lever 18 which is in engagement with it (represented by means of the lever 18'), as a result of which the objective lens is set to the longest focal length via the gear wheels 5, 4, and 3, but the original focal length remains stored in the fixed relative position between the lever 18 and the gear wheel 6. The locking lever 7 is swung to locking lever position 7' as a result of the movement of the gear wheel 6.

The displacement of the setting knob 1 continues and extends until the gear wheel 2 (now in gearwheel position 2') comes into engagement with another gear wheel 17 which, similar to the gear wheel 3, now serves for the setting of the distance, and by again turning the setting knob 1, a shaft (not shown in the drawing) is driven via the gear wheels 2' and 17, said shaft effecting, for instance via a worm gearing, the displacement of lens elements in the objective lens which is necessary for the distance setting (FIG. 1).

After the distance setting which has been effected at maximum focal length, the setting knob 1 can simply be released, in which connection, by the pull of the springs 12 and 13 on the setting knob 1 itself (the point of action 26 of the spring 12 being connected with the camera housing and the point of action 27 being connected with the setting knob 1) and on the lever 7 it brings the setting knob and the displaceable gear wheels as well as the levers 7' and 18' back into their initial or normal position, and during the return displacement of the lever 18 the latter turns the objective lens via the gear wheels 5, 4 and 3 back to the stored focal length.

The sequence of performing the three movements can be fitted by means of stop cams or locking projections.

FIG. 2C shows an additional lens L which can be swung into position aligned with the axially fixed lens Ov, by swinging of a member 40 which carries the additonal lens about a pivot point 41 by means of a wheel 3 cooperating therewith.

While there has been disclosed several embodiments of the invention, it is to be understood that these embodiments are given by example only and not in a limiting sense.

I claim:

1. In a camera having an objective lens, a distance setting device and a focal length setting device as well as a testing device for determining the difference between the distance set on the objective lens and the distance away of the object, by which testing device, when the two distances do not agree, a difference signal is producable, the value of which is dependent, for constant distances, on the focal length for which the objective lens is set, the improvement comprising
program control means;
switch means for actuating said program control means;
said program control means including a memory, and said control means:
during a first phase of its operation, for storing the focal length of the objective lens in said memory;
in a second phase, for setting the focal length via the focal length setting device to a value for which the difference signal of the testing device is a maximum for constant distance conditions,
in a third phase, for permitting setting of the distance on the objective lens manually or automatically; and in a final phase, for setting the focal length of the lens back to the focal length which was originally stored.

2. The camera according to claim 1, wherein
the testing device is formed by a split-prism range finder means for producing the maximum difference signal at the longest focal length.

3. The camera according to claim 1 or 2, wherein
said switch means in cooperation with said program control means for automatically carrying out said first and second phases by the actuating of said switch means, the latter constituting a main switch.

4. The camera according to claim 3, further comprising
means for producing, after the automatic carrying out of said first and said second phases, a signal which is perceptible to the user of the camera in order to remind the user of the distance setting.

5. The camera according to claim 1, further comprising
means for swinging a lens element into position for effecting a change in the focal length.

6. The camera according to claim 1, further comprising
switch element means for actuating said program control means, said switch element means having three degrees of freedom,
said switch element means in cooperation with said program control means, by depressing the switch element means, for storing in said memory the instantaneously set focal length, by displacement for setting the objective lens to the longest focal length, and for effecting the distance setting by turning.

7. The camera according to claim 6, further comprising
a restoring spring means operatively connected such that at least one of the two degrees of freedom, depressing and displacment, can be carried out against the force of said spring means.

8. The camera according to claim 6, further comprising
stop cams constituting means for fixing the sequence of performing the three movements.

9. The camera, having a setting handle actuatable in different actuation modes, in accordance with claim 1, wherein
said program control means includes,
a setting handle knob rotatably and displaceably mounted and forming a cup-shaped hollow cylinder having an axis of symmetry,
a first gear wheel is rigidly connected with said handle knob,
other rotatably mounted gear wheels operatively connected to the focal length setting device and to the distance setting device, respectively,
said first gear wheel upon displacement of said handle knob is engagable with said other gear wheels, respectively, said other gear wheels, respectively, are rotatable by subsequent turning of said handle knob.

10. The camera according to claim 9, wherein
said memory comprises,
another gear wheel operatively mounted on said handle knob so as to be displaceable therewith and rotatable independently thereof,
a rack lever engages said another gear wheel,
said program control means further includes, drive means for moving said rack lever upon rotation of said first gear wheel by one of said other rotatably mounted gear wheels, whereby the movement of said rack lever can be transmitted to said another gear wheel, locking lever means for locking said another gear wheel in any position, and mounted such that upon displacement of said handle knob out of a normal position said another gear wheel is moved relative to said locking lever means into a cooperative position locking said another gear wheel, whereupon said rack lever upon the displacement of said handle knob is carried along by said another gear wheel, and this carried along movement of said rack lever is transmittable to said one of said other rotatably mounted gear wheels in such a manner that upon a return displacement of said handle knob into the normal position said one of said other rotatably mounted gear wheels turns back again, with the reversal of all processes, into a rotary position which said one of said other rotatably mounted gear wheels had before the displacement of said handle knob.

11. A method for setting the distance of a camera objective lens, the camera having a testing device for determining the difference between the distance set on the objective lens and the distance away of the object, by which testing device, when the two distances do not agree, a difference signal is produceable, the value of which is dependent, for constant distances, on the focal length for which the objective lens is set, comprising the steps of in a first phase storing an original focal length of the objective lens in a memory, in a second phase setting the focal length to a value for which the difference signal for the testing device is a maximum for constant distance conditions, in a third phase setting the distance on the objective lens, and in a final phase setting the focal length of the objective lens back to the original focal length which was originally stored in the memory.

* * * * *